(12) United States Patent
Huang et al.

(10) Patent No.: US 12,517,359 B2
(45) Date of Patent: Jan. 6, 2026

(54) ELECTRONIC DEVICE

(71) Applicant: Innolux Corporation, Miaoli County (TW)

(72) Inventors: Huai-Ping Huang, Miaoli County (TW); Chih-Lung Lin, Miaoli County (TW); Chang-Chiang Cheng, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 219 days.

(21) Appl. No.: 18/165,950

(22) Filed: Feb. 8, 2023

(65) Prior Publication Data

US 2023/0314807 A1      Oct. 5, 2023

(30) Foreign Application Priority Data

Mar. 9, 2022   (CN) .......................... 202210233089.0

(51) Int. Cl.
*G02B 27/01*   (2006.01)
*F21V 8/00*   (2006.01)
*G02F 1/1343*   (2006.01)

(52) U.S. Cl.
CPC ....... *G02B 27/0172* (2013.01); *G02B 6/0036* (2013.01); *G02F 1/134309* (2013.01); *G02B 2027/0118* (2013.01); *G02F 2203/48* (2013.01)

(58) Field of Classification Search
CPC .............. G02B 27/0172; G02B 6/0036; G02B 2027/0118; G02B 27/60; G02B 2027/012; G02B 6/005; G02B 6/0011; G02B 2027/0178; G02B 2027/0192; G02F 1/134309; G02F 2203/48; G02F 1/31; G02F 1/136286; G02F 1/133; G06F 3/147; G09G 3/32; G09G 3/20; G06T 19/006

See application file for complete search history.

(56) References Cited

U.S. PATENT DOCUMENTS

| 10,935,853 | B1 * | 3/2021 | den Boer .......... G02F 1/133514 |
| 11,300,838 | B1 | 4/2022 | Yoshiga et al. |
| 2012/0170315 | A1 * | 7/2012 | Fan ........................ G02B 30/33 362/613 |

(Continued)

FOREIGN PATENT DOCUMENTS

| CN | 104616725 | 5/2015 |
| CN | 106662747 | 5/2017 |
| TW | 202129472 | 8/2021 |

OTHER PUBLICATIONS

"Search Report of Europe Counterpart Application", issued on Aug. 1, 2023, p. 1-p. 8.

(Continued)

*Primary Examiner* — Mariam Qureshi
(74) *Attorney, Agent, or Firm* — JCIPRNET

(57) ABSTRACT

An electronic device includes a light modulation module. The light modulation module includes multiple first signal lines and multiple second signal lines. The first signal lines extend along a first direction. The second signal lines extend along a second direction. The second direction is different from the first direction. The first signal lines and the second signal lines are curves. Each of the first signal lines and each of the second signal lines respectively include multiple first patterns, and each of the first patterns has an inflection point.

15 Claims, 9 Drawing Sheets

(56) References Cited

U.S. PATENT DOCUMENTS

| | | | |
|---|---|---|---|
| 2018/0045902 A1* | 2/2018 | Lee | G02B 27/0103 |
| 2018/0101087 A1* | 4/2018 | Shinohara | G02B 6/00 |
| 2021/0003872 A1* | 1/2021 | Russell | G02F 1/134336 |
| 2023/0033343 A1 | 2/2023 | Lu et al. | |

OTHER PUBLICATIONS

"Office Action of Taiwan Counterpart Application", issued on Jun. 2, 2023, p. 1-p. 5.

\* cited by examiner

ELECTRONIC DEVICE

CROSS-REFERENCE TO RELATED APPLICATION

This application claims the priority benefit of China application serial no. 202210233089.0, filed on Mar. 9, 2022. The entirety of the above-mentioned patent application is hereby incorporated by reference herein and made a part of this specification.

BACKGROUND

Technical Field

The disclosure relates to an electronic device.

Description of Related Art

Augmented reality (AR) combines a virtual image with a real scene through an optical system. In order to improve clarity of the virtual image, ambient light intensity of a virtual image region may be reduced through an optical switch. If a wiring in the optical switch and a waveguide structure in the optical system have similar spatial frequencies, a moiré pattern may be generated, which destroys display quality of the augmented reality technology.

SUMMARY

The disclosure is directed to an electronic device, which helps improving display quality.

According to an embodiment of the disclosure, an electronic device includes a light modulation module. The light modulation module includes multiple first signal lines and multiple second signal lines. The first signal lines extend along a first direction. The second signal lines extend along a second direction. The second direction is different from the first direction. The first signal lines and the second signal lines are curves. Each of the first signal lines and each of the second signal lines respectively includes multiple first patterns, and each of the first patterns has an inflection point.

In order for the aforementioned features and advantages of the disclosure to be more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
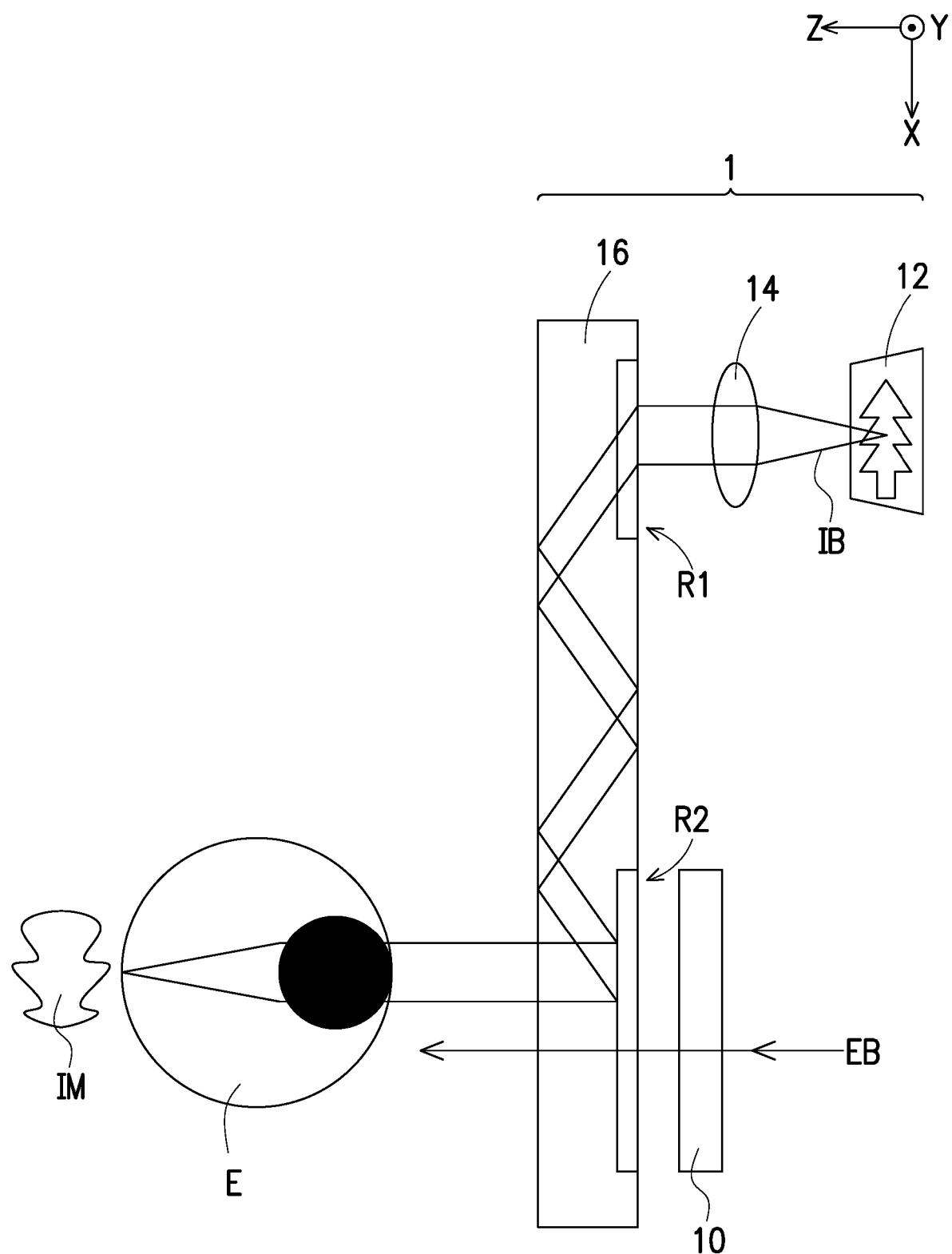
FIG. 1 is a partial schematic diagram of an electronic device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Throughout this disclosure and the appended claims, certain terms may be used to refer to particular components. Those skilled in the art should understand that electronic device manufacturers may refer to the same components by different names. This specification does not intend to distinguish between components that have the same function but have different names. In the following description and claims, words such as "containing" and "comprising" are open-ended words, so they should be interpreted as meaning "including but not limited to . . . ".

The directional terms mentioned in this specification, such as "up", "down", "front", "rear", "left", "right", etc., only refer to the directions of the drawings. Therefore, the used directional terminology is illustrative, and is not used for limiting the disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or exaggerated for clarity's sake.

One structure (or layer, element, substrate) described in the disclosure is located on/above another structure (or layer, element, substrate), which means that the two structures are adjacent and in direct connection, or means that the two structures are adjacent but in indirect connection. Indirect connection means that there is at least one intermediate structure (or intermediate layer, intermediate element, intermediate substrate, intermediate space) between the two structures, a lower surface of a structure is adjacent or directly connected to an upper surface of the intermediate structure, and an upper surface of the other structure is adjacent to or directly connected to a lower surface of the intermediate structure. The intermediary structure may be composed of a single-layer or multi-layer physical structure or non-physical structure, which is not limited by the disclosure. In the disclosure, when a certain structure is described to be "on" another structure, it means that the certain structure is "directly" on the another structure, or means that the certain structure is "indirectly" on the another structure, i.e., at least one structure is further clamped between the certain structure and the another structure.

The terms "equal to" or "same" are generally interpreted as being within 20% of a given value or range, or interpreted as being within 10%, 5%, 3%, 2%, 1%, or 0.5% of the given value or range.

The ordinal numbers used in the specification and claims, such as "first", "second", etc., are used to modify components, and do not imply and represent that the component or these components have any previous ordinal numbers, and do not represent a sequence of one component with another, or a sequence in a manufacturing method. The use of these ordinal numbers is only to make a clear distinction between one component with a certain name and another component with the same name. The same terms may not be used in the claims and the specification, and accordingly, a first component in the specification may be a second component in the claims.

The electrical connection or coupling described in this disclosure may refer to direct connection or indirect connection. In the case of direct connection, terminals of components on two circuits are directly connected or connected to each other by a conductor line segment, and in the case of indirect connection, there are switches, diodes, capacitors, inductors, resistors, other suitable components, or a combination of the above components between the terminals of the components on the two circuits, but the disclosure is not limited thereto.

In the disclosure, a thickness, length, width, and area may be measured by using an optical microscope, and the thickness may be obtained by measuring a cross-sectional image in the electron microscope, but the disclosure is not limited thereto. In addition, there may be a certain error in any two values or directions used for comparison. In addition, the terms "equal to", "equal", "same", "substantially" or "approximately" mentioned in the present disclosure usually represent within 10% of a given value or range. Moreover, the expressions "the given range is a first value to a second value", "the given range falls within a range of the first value to the second value" mean that the given range includes the first value, the second value, and other values there between. If a first direction is perpendicular to a second direction, an angle between the first direction and the second direction may be between 80 degrees and 100 degrees; and if the first direction is parallel to the second direction, the angle between the first direction and the second direction may be between 0 degree and 10 degrees.

It should be noted that in the following embodiments, features in multiple different embodiments may be substituted, reorganized, and mixed to complete other embodiments without departing from the spirit of the present disclosure. The features of the various embodiments may be mixed and matched arbitrarily as long as they do not violate or conflict with the spirit of the disclosure.

Unless otherwise defined, all terms (including technical and scientific terms) used herein have the same meanings as commonly understood by those skilled in the art to which this disclosure belongs. It is understandable that these terms, such as those defined in commonly used dictionaries, should be interpreted as having meaning consistent with the relevant technology and the background or context of this disclosure, and should not be interpreted in an idealized or excessively formal way, unless there is a special definition in the embodiment of the disclosure.

In the disclosure, the electronic device may include a display device, a backlight device, an antenna device, a sensing device, or a splicing device, but the disclosure is not limited thereto. The electronic device may be a bendable or flexible electronic device. The display device may be a non-self-luminous type display device or a self-luminous type display device. The electronic device may include, for example, liquid crystal, light-emitting diode, fluorescence, phosphor, quantum dot (QD), other suitable display media, or a combination thereof. The antenna device may be a liquid crystal type antenna device or a non-liquid crystal type antenna device, and the sensing device may be a sensing device that senses capacitance, light, heat, or ultrasound, but the disclosure is not limited thereto. In the disclosure, the electronic device may include electronic components, and the electronic components may include passive components and active components, such as capacitors, resistors, inductors, diodes, transistors, etc. The diode may include a light-emitting diode or a photodiode. The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. In addition, a shape of the electronic device may be rectangular, circular, polygonal, a shape with curved edges, or other suitable shapes. The electronic device may have peripheral systems such as a driving system, a control system, a light source system, etc., to support a display device, an antenna device, a wearable device (for example, including augmented reality or virtual reality), an in-vehicle device (for example, including a vehicle windshield), or a splicing device. In the following descriptions, the display device is used as an electronic device or a splicing device to describe the content of the disclosure, but the disclosure is not limited thereto.

Figure 2A:
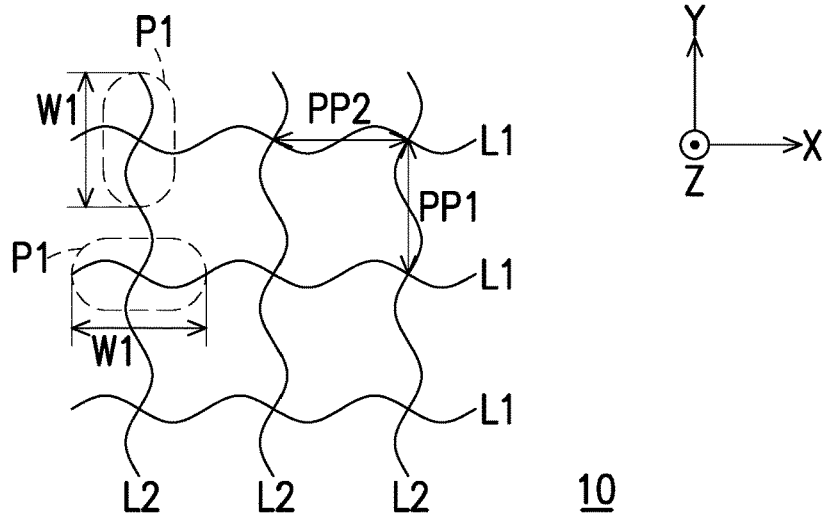
FIG. 2A to FIG. 2C are respectively three partial schematic top views of a light modulation module in FIG. 1.
Figure 2B:
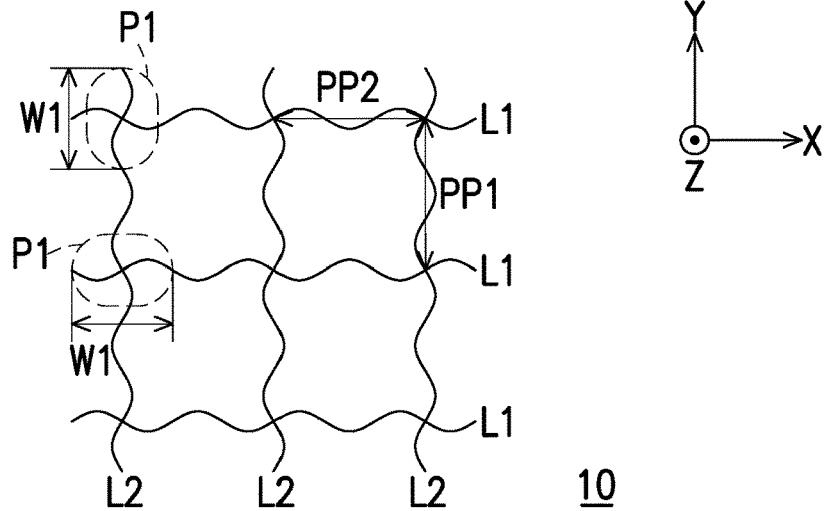
Figure 2C:
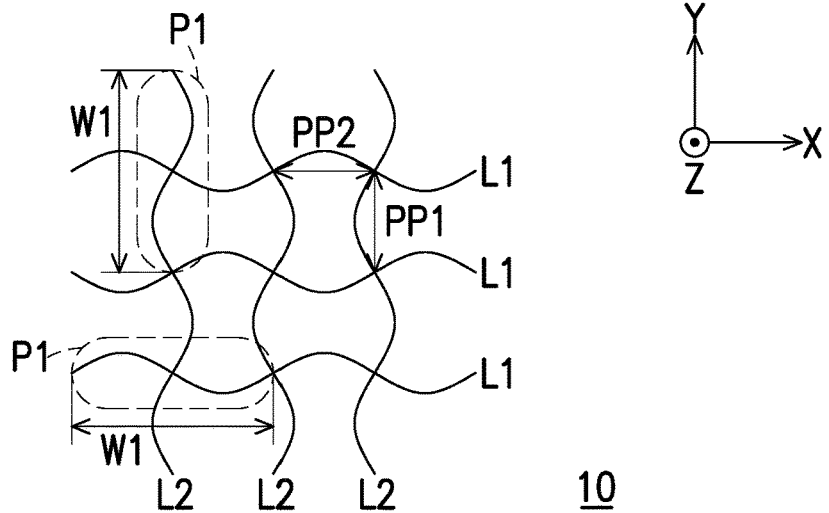
Figure 3A:
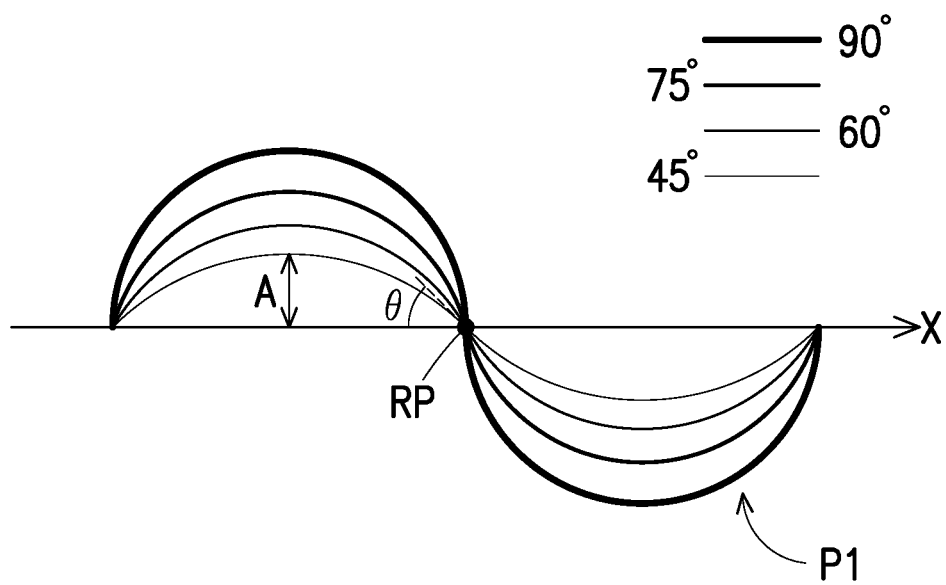
FIG. 3A is a schematic diagram of a first pattern.
Figure 3B:
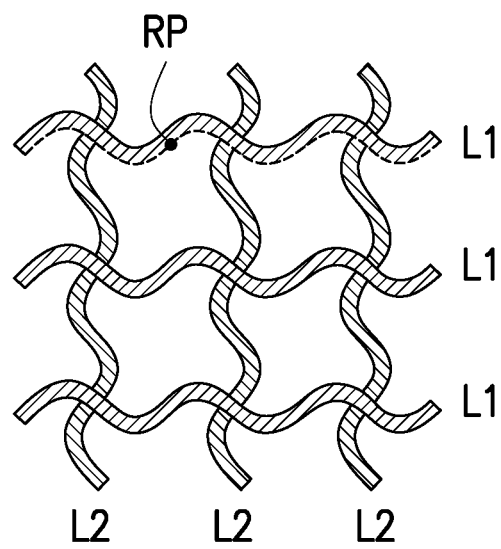
FIG. 3B is a partial schematic top view of a light modulation module.

FIG. 1 is a partial schematic diagram of an electronic device according to an embodiment of the disclosure. FIG. 2A to FIG. 2C are respectively three partial schematic top views of a light modulation module in FIG. 1. FIG. 3A is a schematic diagram of a first pattern. FIG. 3B is a partial schematic top view of a light modulation module. FIG. 4A to FIG. 9B are respectively various partial schematic top views of the light modulation module in FIG. 1. The technical solutions provided by the different embodiments in FIG. 1 to FIG. 8B may be replaced, combined or mixed with each other to form another embodiment without violating the spirit of the disclosure.

Referring to FIG. 1, an electronic device 1 may be, for example, applied to augmented reality and may include a light modulation module 10, but the disclosure is not limited thereto. According to different requirements, the electronic device 1 may further include other elements. For example, the electronic device 1 may further include a display unit 12, a lens group 14 and a light guide element 16, but the disclosure is not limited thereto.

The light modulation module 10, the display unit 12 and the lens group 14 may be disposed on a side of the light guide element 16 away from an eye E of a user and disposed corresponding to the light guide element 16. In detail, the display unit 12 is disposed corresponding to a light incident region R1 of the light guide element 16, and the lens group 14 is disposed between the light incident area R1 of the light guide element 16 and the display unit 12. The light modulation module 10 is disposed corresponding to a light output region R2 of the light guide element 16. In other embodiments, the positions of the light modulation module 10, the display unit 12 and the lens group 14 are not limited to the embodiment of the disclosure.

The display unit 12 is configured to provide a virtual image. For example, the display unit 12 may be a micro display unit, such as a micro light emitting diode display unit, a micro organic light emitting diode display unit or a liquid crystal on silicon (LCoS) display unit, but the disclosure is not limited thereto.

An image beam IB from the display unit 12 may be converged to the light incident region R1 of the light guide element 16 through the lens group 14. The lens group 14 may include one or more lenses, which is not limited by the disclosure.

The light guide element 16 is, for example, a waveguide (optical waveguide), and the image beam IB entering the light guide element 16 may be transmitted in the light guide element 16 in the form of total internal reflection (TIR). For example, a material of the light guide element 16 may include glass, plastic, ceramic, quartz, sapphire or a combination of the above materials, but the disclosure is not limited thereto.

The light incident region R1 of the light guide element 16 may have multiple microstructures (not shown) for transmitting the image light IB entering the light guide element 16 toward the light output region R2 of the light guide element 16, and the microstructures are, for example, multiple straight grooves or multiple straight bumps disposed along the direction X and extending along the direction Y, but the disclosure is not limited thereto. The light output region R2 of the light guide element 16 may have multiple microstructures (not shown) for transmitting the image light IB transmitted in the light guide element 16 toward the eye E of the user, and the microstructures are, for example, multiple straight grooves or multiple straight bumps disposed along the direction X and extending along the direction Y, but the disclosure is not limited thereto.

The light modulation module 10 disposed corresponding to the light output region R2 of the light guide element 16 is, for example, an optical switch, and the light modulation module 10 may reduce a probability that environmental beam EB of a virtual image region enters the optical system (for example, the light guide element 16) by means of electronic control. By reducing an intensity of the environmental beam EB in the virtual image region, a probability of generating an overlapping image may be reduced, thereby helping to improve clarity of a virtual image IM and/or improve a contrast of the virtual image IM.

Although FIG. 1 only shows one set of display unit erected in front of a single eye E of the user in the electronic device 1, it should be understood that the electronic device 1 may include two sets of display units, and the two sets of display units may be respectively set in front of both eyes of the user (or on both sides of the two eyes), so that the user's eyes may receive display information.

Referring to FIG. 2A to FIG. 2C, the light modulation module 10 may include multiple first signal lines L1 and multiple second signal lines L2. The first signal lines L1 extend along a first direction (for example, the direction X). The second signal lines L2 extend along a second direction (for example, the direction Y). The second direction is different from the first direction. The first signal lines L1 and the second signal lines L2 are curved lines. Each of the first signal lines L1 and each of the second signal lines L2 respectively includes multiple first patterns P1, and each of the first patterns P1 has an inflection point RP (referring to FIG. 3A). In this specification, a point at which a curve changes from convex to concave, or from concave to convex is referred to as an inflection point. Referring to FIG. 3B, the inflection point may be, for example, an inflection point on one of the edges (such as the lower edge, indicated by a dotted line) of a signal line (such as the first signal line L1 or the second signal line L2), or may be an inflection point of a center line of the signal line, but the disclosure is not limited thereto.

In detail, the light modulation module 10 may be an electronically controlled light modulation module, and the light modulation module 10 may be a passively driven or actively driven light modulation module. Taking the active driving light modulation module as an example, the first signal line L1 and the second signal line L2 may be respectively a scan line and a data line, but the disclosure is not limited thereto. Although not shown, the light modulation module 10 may further include multiple switching elements, a first electrode layer, a second electrode layer, and a dielectric layer (for example, liquid crystal). The switching elements are respectively electrically connected to the first signal lines L1 and the second signal lines L2. The first electrode layer and the second electrode layer may be disposed on a same side or opposite sides of the dielectric layer. The switching elements, the first signal lines L1 and the second signal lines L2 may be used to change a potential difference between the first electrode layer and the second electrode layer to adjust a state of the dielectric layer (such as an inclining direction of the liquid crystal), so as to achieve a dimming effect.

Through the curve line design of the first signal lines L1 and the second signal lines L2, a moiré pattern generated due to the signal line (such as the first signal line L1 or the second signal line L2) in the light modulation module 10 and the waveguide structure (such as multiple microstructures in the light output region R2 in FIG. 1) in the optical system having similar spatial frequencies may be mitigated, which helps to improve display quality.

In some embodiments, regularity of the signal lines and the waveguide structure in the optical system may be further reduced by changing a spacing of the first signal lines L1 and/or the second signal lines L2, thereby further mitigating the interference problem. For example, the first pattern P1 has a first width W1 along the first direction (for example, the direction X) or the second direction (for example, the direction Y), and the spacing between the first signal lines L1 or the second signal lines L2 may be an integer multiple of a half of the width W1. In other words, two adjacent first signal lines L1 or two adjacent second signal lines L2 may be separated by one-half, one, three-half, two or more first patterns P1.

As shown in FIG. 2A, a distance PP1 between adjacent two of the first signal lines L1 may be an even multiple of a half of the first width W1, for example, the distance PP1 between two adjacent first signal lines L1 may be twice of the half the first width W1, i.e., two adjacent first signal lines L1 may be separated by one first pattern P1, but the disclosure is not limited thereto. In other embodiments, two adjacent first signal lines L1 may be separated by two or more first patterns P1.

Similarly, a distance PP2 between adjacent two of the second signal lines L2 may be an even multiple of the half of the first width W1, for example, the distance PP2 between two adjacent second signal lines L2 may be twice of the half the first width W1, i.e., two adjacent second signal lines L2 may be separated by one first pattern P1, but the disclosure is not limited thereto. In other embodiments, two adjacent second signal lines L2 may be separated by two or more first patterns P1.

Under the structure in which the distance PP1 (or the distance PP2) between adjacent two of the first signal lines L1 (or the second signal lines L2) is an even multiple of the half of the first width W1, the adjacent two of the first signal lines L1 (or the second signal lines L2) may be designed to be parallel, so that a pixel size is consistent (for example, a pixel size difference is less than or equal to 15%), thereby reducing the problem of uneven charging or screen flickering caused by inconsistent pixel sizes. Two curves being parallel means that the distance between the two curves remains the same. The pixel size refers to an area enclosed by two adjacent first signal lines L1 and two adjacent second signal lines L2 in a top view. The first signal lines L1 and the second signal lines L2 may be photographed by using an optical microscope, and the pixel size is calculated through drawing software or image processing software.

As shown in FIG. 2B and FIG. 2C, the distance PP1 between adjacent two of the first signal lines L1 may be an odd multiple of the half of the first width W1, for example, the distance PP1 between two adjacent first signal lines L1 may be three times (referring to FIG. 2B) or one time (referring to FIG. 2C) of the half of the first width W1, i.e., two adjacent first signal lines L1 may be separated by three-half of the first patterns P1 or one-half of the first pattern P1, but the disclosure is not limited thereto. In other embodiments, two adjacent first signal lines L1 may be separated by five-half or more of the first patterns P1.

Similarly, the distance PP2 between adjacent two of the second signal lines L2 may be an odd multiple of the half of the first width W1, for example, the distance PP2 between two adjacent second signal lines L2 may be three times (referring to FIG. 2B) or one time (referring to FIG. 2C) of the half of the first width W1, i.e., two adjacent second signal lines L2 may be separated by three-half of the first patterns P1 or one-half of the first pattern P1, but the disclosure is not limited thereto. In other embodiments, two adjacent second signal lines L2 may be separated by five-half or more of the first patterns P1.

Under the structure in which the distance PP1 (or the distance PP2) between adjacent two of the first signal lines L1 (or the second signal lines L2) is an odd multiple of the half of the first width W1, the adjacent two of the first signal lines L1 (or the second signal lines L2) may be designed to be mirror-symmetrical, so that the pixel sizes are consistent, thereby reducing the problem of uneven charging or screen flickering caused by inconsistent pixel sizes. When two curves are mirror-symmetrical, it means that the two curves are axis-symmetrical or line-symmetrical. For example, there is an imaginary line between two adjacent signal lines along an extending direction of the signal lines, and the imaginary line may be the axis of symmetry of the two adjacent signal lines.

In some embodiments, the regularity of the signal lines and the waveguide structure in the optical system may be further reduced by changing amplitudes of the first signal line L1 and/or the second signal line L2, thereby further mitigating the interference problem. The larger the amplitude of the signal line is, the smaller the regularity with the waveguide structure in the optical system is, and the better the interference problem may be mitigated. Referring to FIG. 3A, an amplitude A of the first pattern P1 is positively correlated with an included angle θ between a tangent line of the inflection point RP (referring to a dashed line in FIG. 3A) and the first direction (for example, the direction X). The larger the included angle θ is, the larger the amplitude of the first pattern P1 is. FIG. 3A schematically shows the first patterns P1 corresponding to the included angles θ of 45 degrees, 60 degrees, 75 degrees, and 90 degrees, but an implementation range of the included angles θ is not limited thereto.

Figure 4A:
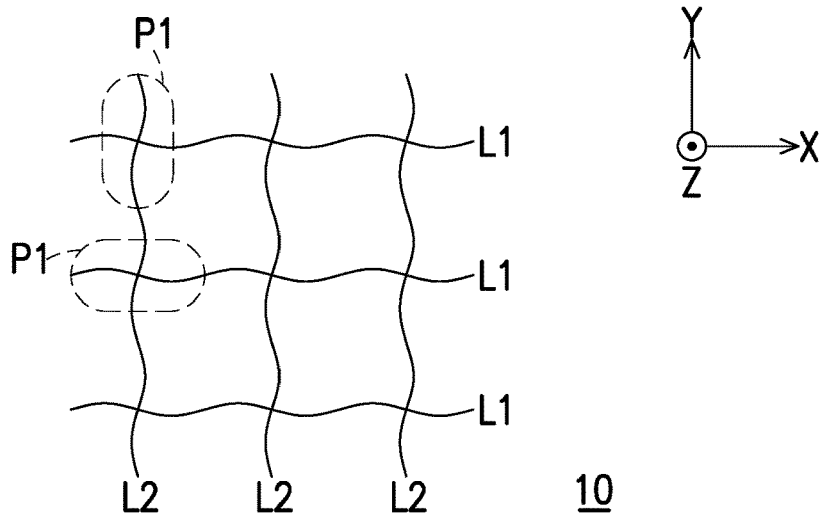
FIG. 4A to FIG. 9B are respectively various partial schematic top views of the light modulation module in FIG. 1.
Figure 4B:
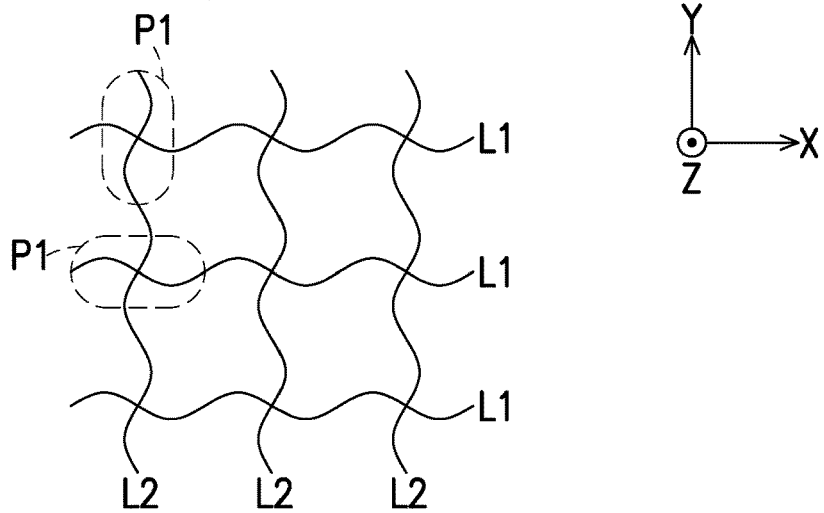
Figure 4C:
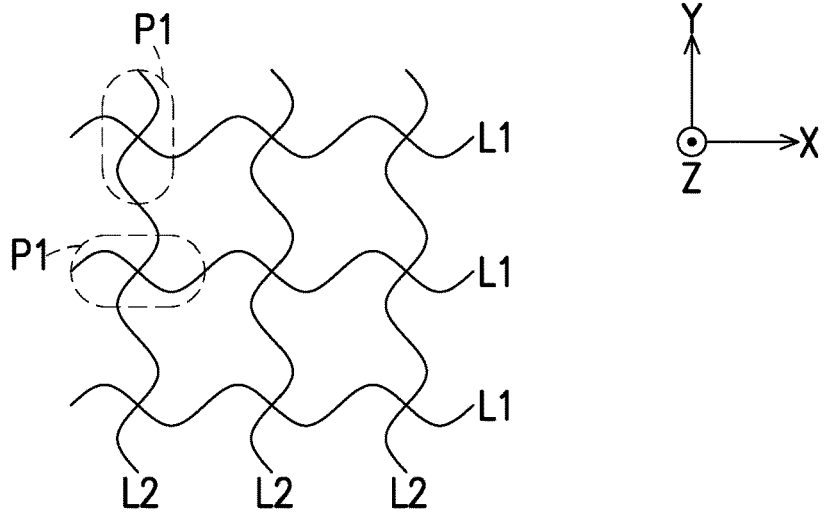

In some embodiments, the included angle θ between the tangent line of the inflection point RP and the first direction (for example, the direction X) may be greater than or equal to 30 degrees and less than or equal to 60 degrees, but the disclosure is not limited thereto. FIG. 4A to FIG. 4C respectively illustrate the first patterns P1 corresponding to the included angle θ of 30 degrees, 45 degrees and 60 degrees. In other embodiments, although not shown, the included angle θ may be any angle within a range of 30 degrees to 60 degrees.

Figure 5A:
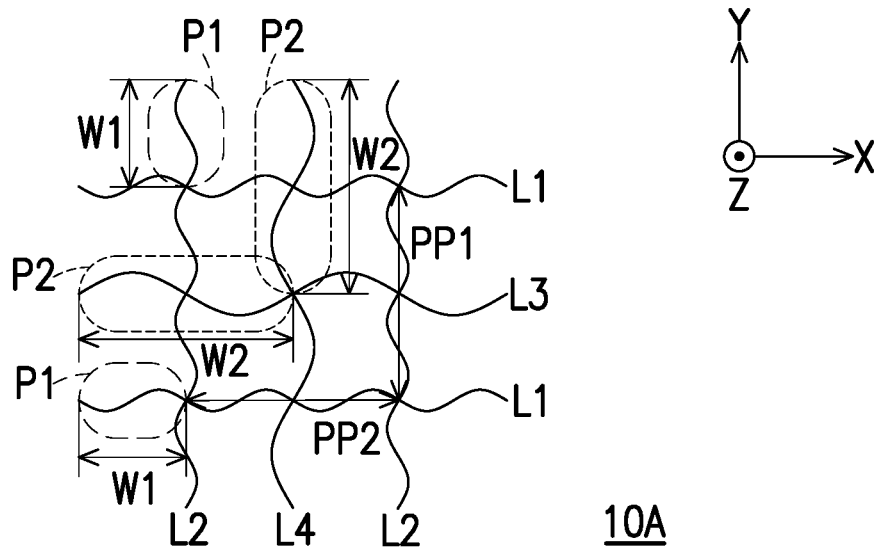
Figure 5B:
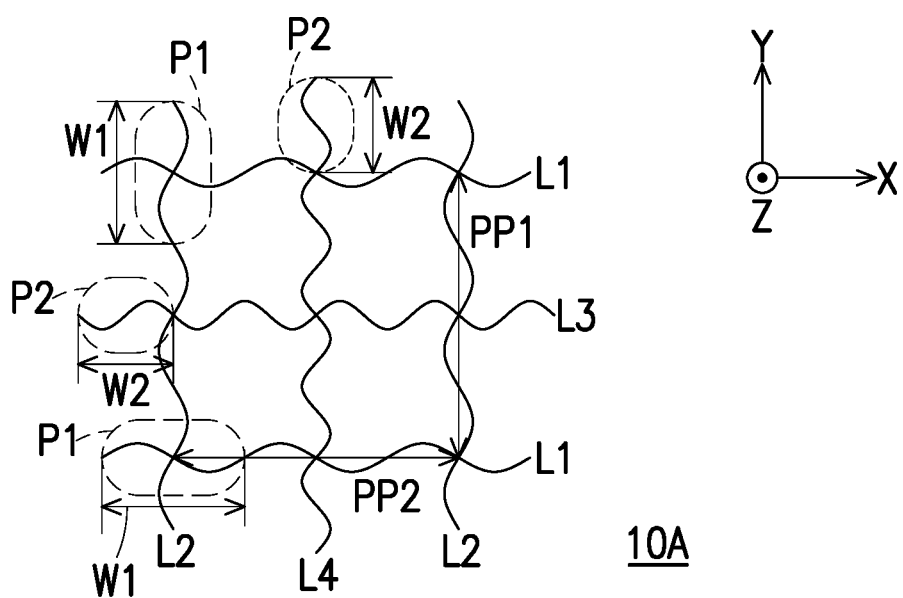

In some embodiments, the regularity of the signal lines and the waveguide structure in the optical system may be further reduced by changing a width of a curve pattern (such as the second pattern P2 in FIG. 5) of the odd/even-numbered signal lines disposed along the first direction (such as the direction X) or the second direction (such as the direction Y), thereby further mitigating the interference problem. As shown in FIG. 5A and FIG. 5B, a dimmer module 10A may also include multiple third signal lines L3 (only one is schematically shown in FIG. 5A) and multiple fourth signal lines L4 (only one is schematically shown in FIG. 5A).

The third signal lines L3 extend along the first direction (for example, the direction X), and the third signal lines L3 and the first signal lines L1 are disposed in alternation. The fourth signal lines L4 extend along the second direction (for example, the direction Y), and the fourth signal lines L4 and the second signal lines L2 are disposed in alternation. The third signal lines L3 and the fourth signal lines L4 are curves. Each of the third signal lines L3 and each of the fourth signal lines L4 respectively includes a second patterns P2, and each of the second patterns P2 has an inflection point RP (referring to FIG. 3A).

A width W2 of the second pattern P2 along the first direction (for example, the direction X) or the second direction (for example, the direction Y) is different from the width W1 of the first pattern P1 along the first direction (for example, the direction X) or the second direction (for example, the direction Y). As shown in FIG. 5A, the width W2 may be larger than the width W1, or, as shown in FIG. 5B, the width W2 may be smaller than the width W1.

In FIG. 5A, the distance PP1 (or the distance PP2) between adjacent two of the first signal lines L1 (or the second signal lines L2) is, for example, four times of the half of the first width W1, i.e., the two adjacent first signal lines L1 (or two adjacent second signal lines L2) are separated by two first patterns P1, but the disclosure is not limited thereto. In addition, a distance (not shown) between adjacent two of the third signal lines L3 (or the fourth signal lines L4) is, for example, twice of the half of the second width W2, i.e., two adjacent third signal lines L3 (or two adjacent fourth signal lines L4) are separated by one second pattern P2, but the disclosure is not limited thereto.

In FIG. 5B, the distance PP1 (or the distance PP2) between adjacent two of the first signal lines L1 (or the second signal lines L2) is, for example, four times of the half of the first width W1, i.e., the two adjacent first signal lines L1 (or two adjacent second signal lines L2) are separated by two first patterns P1, but the disclosure is not limited thereto. In addition, a distance (not shown) between adjacent two of the third signal lines L3 (or the fourth signal lines L4) is, for example, six times of the half of the second width W2, i.e., the two adjacent third signal lines L3 (or two adjacent fourth signal lines L4) are separated by three second patterns P2, but the disclosure is not limited thereto.

Figure 6A:
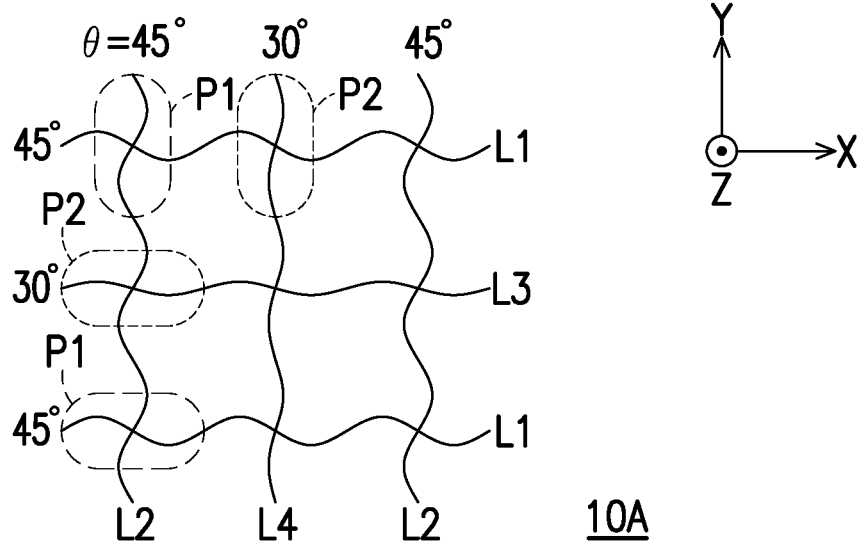
Figure 6B:
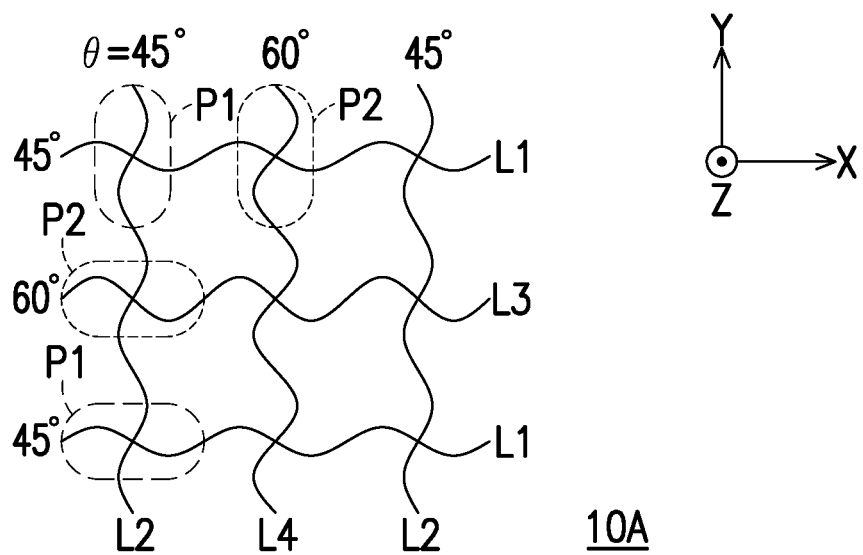

In some embodiments, it is also possible to further reduce the regularity of the signal lines and the waveguide structure in the optical system by changing the amplitudes of the odd/even-numbered signal lines disposed along the first direction (such as the direction X) or the second direction (such as the direction Y), thereby further mitigating the interference problem. As shown in FIG. 6A and FIG. 6B, the included angle θ between the tangent line (not shown) of the inflection point (not shown) of the second pattern P2 of the third signal lines L3 (or fourth signal lines L4) and the first direction (or the second direction) may be different from the included angle θ between the tangent line (not shown) of the inflection point (not shown) of the first pattern P1 and the first direction (or the second direction). For example, in FIG. 6A, the included angle θ corresponding to each of the first signal lines L1 (or the second signal lines L2) is 45 degrees, and the included angle θ corresponding to each of the third signal lines L3 (or the fourth signal lines L4) is 30 degrees. In FIG. 6B, the included angle θ corresponding to each of the first signal lines L1 (or the second signal lines L2) is 45 degrees, and the included angle θ corresponding to each of the third signal lines L3 (or the fourth signal lines L4) is 60 degrees.

In some embodiment, it is also possible to further reduce the regularity of the signal lines and the waveguide structure in the optical system by changing the amplitudes of the odd/even-numbered signal lines disposed along the first direction (such as the direction X) or the second direction (such as the direction Y) and a width of the curve pattern (for example, the first pattern or the second pattern), thereby further mitigating the interference problem. For example, the amplitude of the odd-numbered signal lines disposed along the first direction (for example, the direction X) or the second direction (for example, the direction Y) and the width of the curve pattern may be different from the amplitudes of the even-numbered signal lines disposed along the first direction (for example, the direction X) or the second direction (for example, the direction Y) and the width of the curve pattern.

Figure 7A:
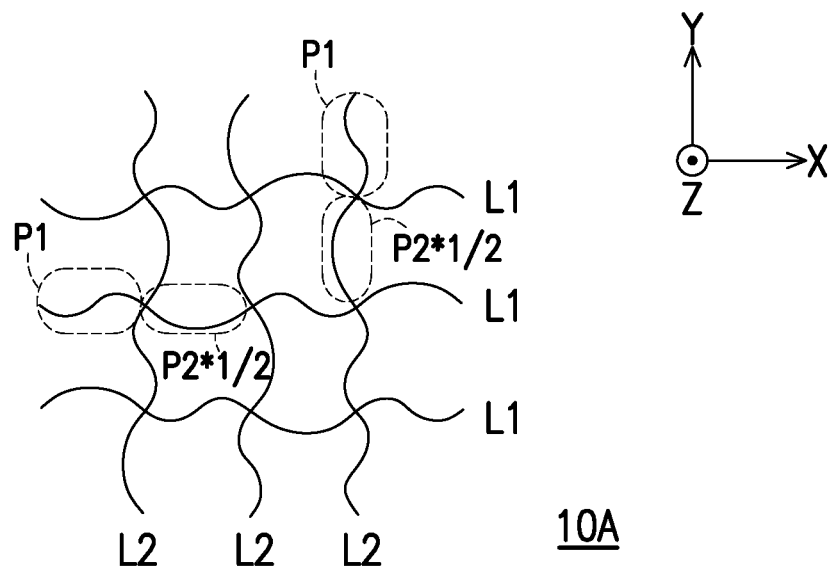
Figure 7B:
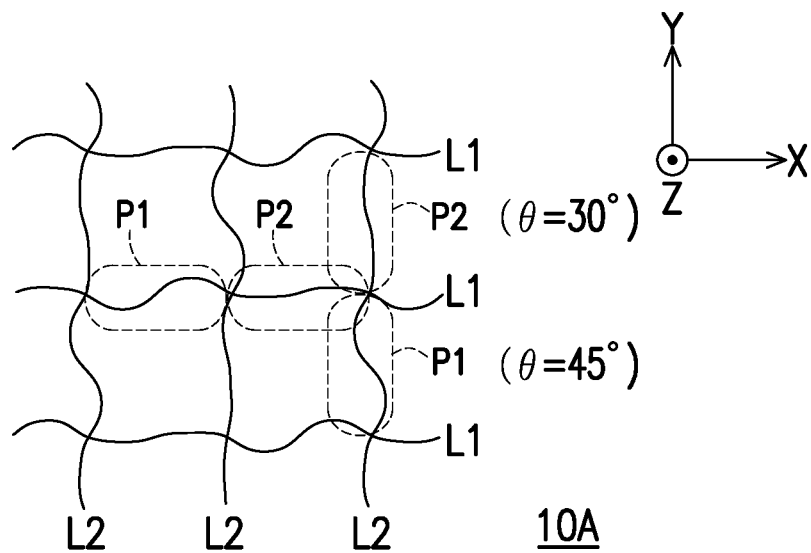

In some embodiments, a same signal line may have multiple amplitudes and/or multiple curve patterns to further reduce the regularity of the signal lines and the waveguide structure in the optical system, thereby further mitigating the interference problem. For example, referring to FIG. 7A, each of the first signal lines L1 (or the second signal lines L2) includes, for example, different curve patterns disposed in alternation, for example, one first pattern P1 and ½ second pattern P2 disposed in alternation along the first direction (or the second direction). Referring to FIG. 7B, each of the first signal lines L1 (or the second signal lines L2), for example, includes one first pattern P1 and one second pattern P2 disposed in alternation along the first direction (or the second direction), and an included angle θ between a tangent line (not shown) of an inflection point (not shown) of the second pattern P2 and the first direction (for example, direction X) may be different from an included angle θ between a tangent line (not shown) of an inflection point (not shown) of the first pattern P1 and the first direction (for example, direction X), but the disclosure is not limited thereto.

In some embodiments, curve patterns of different widths and amplitudes may be combined to reduce the regularity of the signal lines and the waveguide structure in the optical system, thereby further mitigating the interference problem.

Figure 8A:
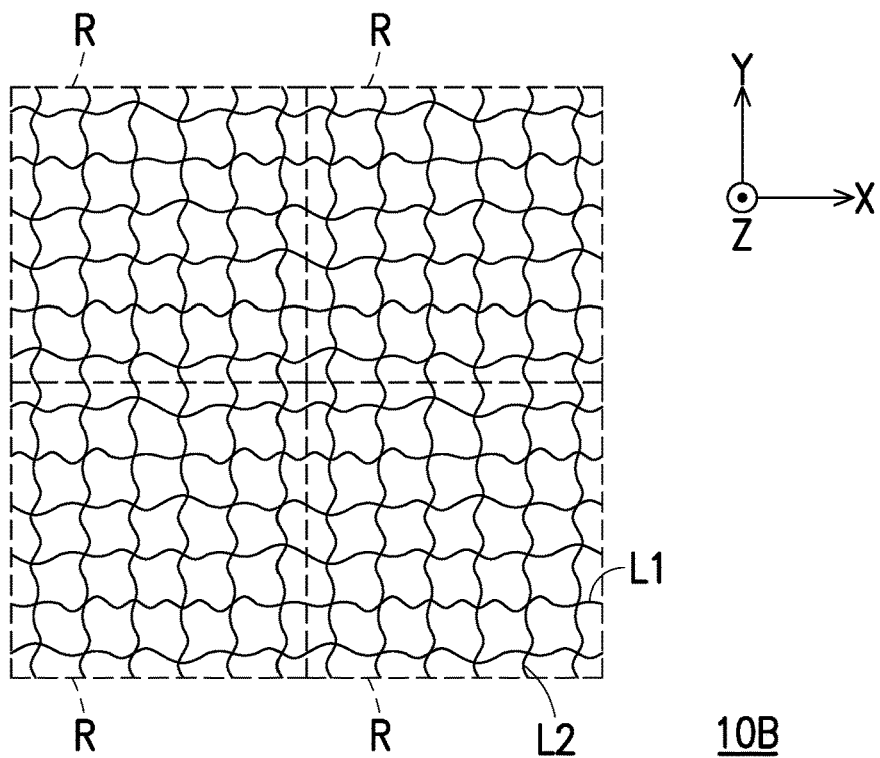
Figure 8B:
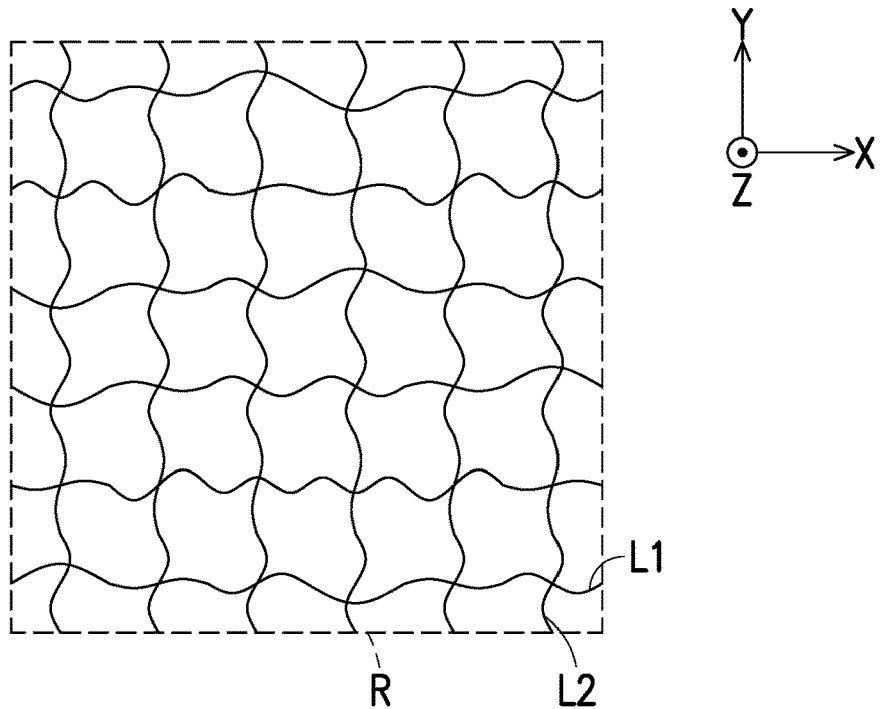

In some embodiments, the signal lines in the light modulation module may have a random curve pattern design to minimize the regularity of the signal lines and the waveguide structure in the optical system. Alternatively, based on the convenience of design and/or manufacturing process, as shown in FIG. 8A and FIG. 8B, an active region (i.e., a region where a pixel array is located) of the light modulation module 10B may have multiple units R. The units R have a consistent curve pattern design, and the units R may be arranged in an array. Each of the units R may have the first signal lines L1 extending along the first direction (for example, the direction X) and the second signal lines L2 extending along the second direction (for example, the direction Y). The first signal lines L1 (or the second signal lines L2) may have various curve pattern designs. In some embodiments, each of the first signal lines L1 (or the second signal lines L2) may have various amplitudes. In some embodiments, the first signal lines L1 (or the second signal lines L2) may have curve patterns of various widths. Under the above-mentioned design structure, a pixel size difference may be controlled to be less than or equal to 15%, so as to reduce the problem of uneven charging or screen flickering caused by inconsistent pixel sizes.

Figure 9A:
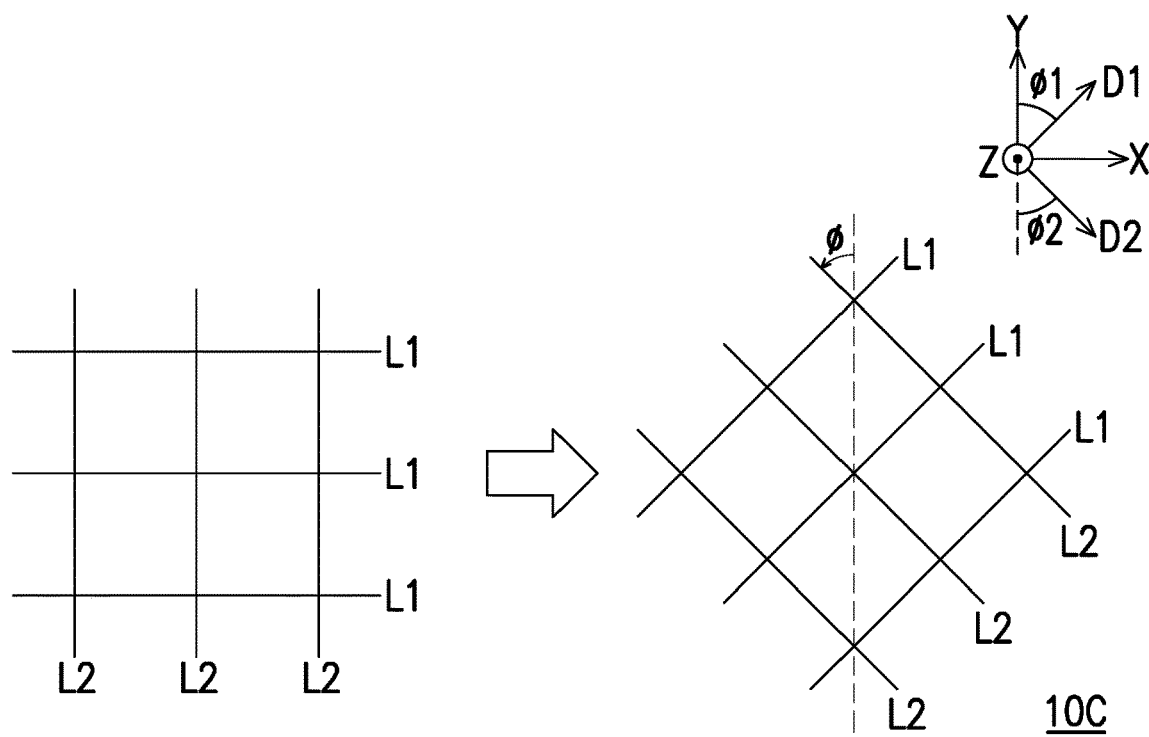
Figure 9B:
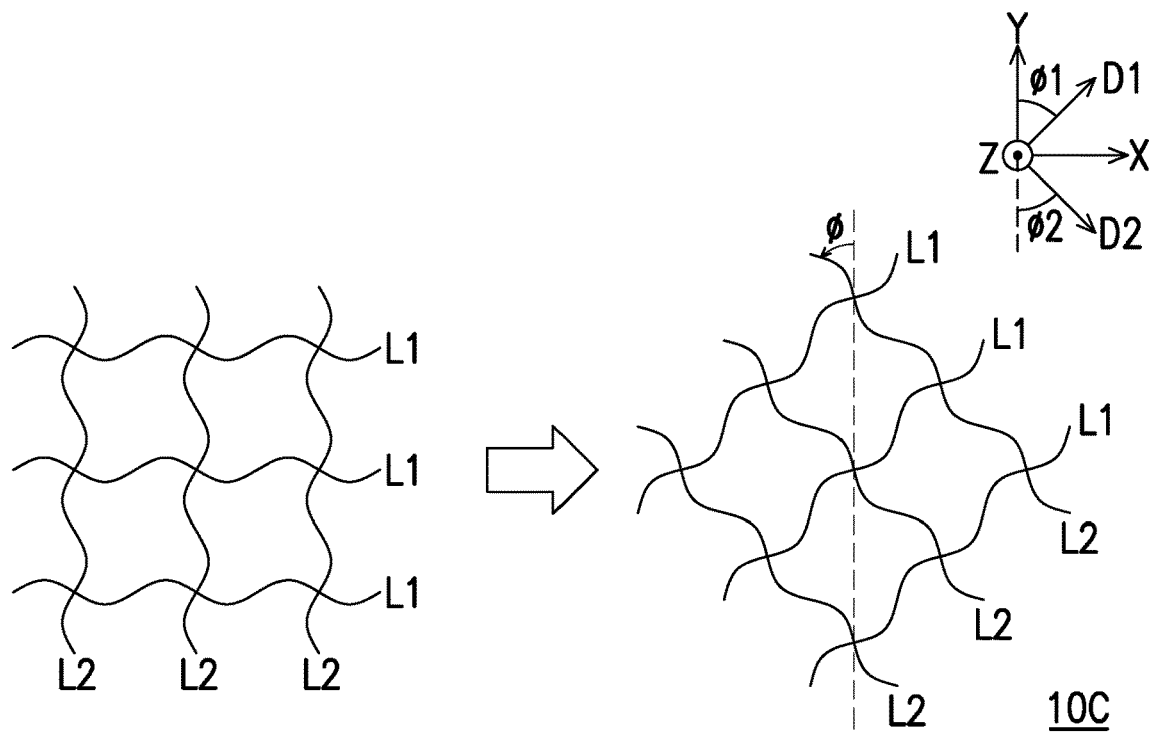

In some embodiments, the light modulation module may be rotated by an angle, so that the extending direction of the signal lines in the light modulation module and the extending direction of the microstructures of the light guide element have a staggered angle layout, so as to reduce a moiré pattern caused by overlapping arrangement of the signal lines and the microstructures. As shown in FIG. 9A and FIG. 9B, the signal lines in a light modulation module 10C may be rotated by an angle $\phi$, so that the first signal lines L1 extending along the first direction D1 and/or the second signal lines L2 extending along the second direction D2 are not parallel and not perpendicular to the extending direction (for example, the direction Y) of the microstructures of the light guide element (not shown in FIG. 9A and FIG. 9B). For example, the light guide element 16 (referring to FIG. 1) may include multiple microstructures (for example, multiple microstructures at the light output region R2 in FIG. 1, not shown) extending along a third direction (for example, the direction Y), where an included angle $\phi 1$ between the third direction (for example, the direction Y) and the first direction D1 and the included angle $\phi 2$ between the third direction (for example, the direction Y) and the second direction D2 may be greater than or equal to 30 degrees and less than or equal to 60 degrees to further reduce the regularity of the signal lines and the waveguide structure in the optical system, thereby further mitigating the interference problem.

In some embodiments, although not shown, the light modulation module may be a passively driven light modulation module. For example, in the light modulation module, the aforementioned switching elements may be omitted, and the aforementioned signal lines (for example, metal wires) may be replaced by transparent electrodes, so as to reduce the interference problem. In some embodiments, the transparent electrodes may be multiple straight bar-shape transparent electrodes respectively disposed along the direction X and the direction Y. In some embodiments, the transparent electrodes may also adopt the above-mentioned curve pattern design, so as to further reduce the regularity of the signal lines and the waveguide structure in the optical system, thereby further mitigating the interference problem. In some embodiments, a local driving manner may be adopted to control the light modulation module, so as to improve a light shielding capability. For example, the pixels required to be driven in the light modulation module may be calculated according to a position and a size of a virtual image, so as to find out row electrodes and column electrodes corresponding to these pixels, and only activate these row electrodes and column electrodes. Since full-screen driving is not required, the light shielding capability of passive driving may be improved.

In summary, in the embodiments of the disclosure, through the curve design of the first signal lines and the second signal lines, the moiré pattern generated due to the signal lines in the light modulation module and the waveguide structure in the optical system having similar spatial frequencies may be reduced, thereby helping to improve display quality.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

Although the embodiments and advantages of the embodiments of the disclosure have been disclosed as above, it should be understood that any person skilled in the art, without departing from the spirit and scope of the disclosure, may make changes, substitutions and modifications, and the features of the embodiments may be arbitrarily mixed and replaced to form other new embodiments. Moreover, a protection scope of the disclosure is not limited to the processes, machines, manufacturing, material composition, devices, methods, and steps of the specific embodiments described in the specification, and any person skilled in the art should understand the processes, machines, manufacturing, material composition, devices, methods, and steps used currently or developed in the future from the content disclosed in the disclosure, as long as the substantially same functions may be implemented or the substantially same results may be obtained in the embodiments described herein. Therefore, the protection scope of the disclosure includes the above processes, machines, manufacturing, material composition, devices, methods, and steps. In addition, each claim constitutes an individual embodiment, and the protection scope of the disclosure also includes a combination of each claim and the embodiment. The protection scope of the disclosure is defined by the appended claims.

What is claimed is:

1. An electronic device, comprising:
   a light modulation module, comprising:
      a plurality of first signal lines, extending along a first direction;
      a plurality of second signal lines, extending along a second direction, wherein the second direction is different from the first direction, and the plurality of first signal lines and the plurality of second signal lines are curved;
      a plurality of third signal lines, extending along the first direction, wherein the plurality of third signal lines and the plurality of first signal lines are disposed in alternation; and
      a plurality of fourth signal lines, extending along the second direction, wherein the plurality of fourth signal lines and the plurality of second signal lines are disposed in alternation, and the plurality of third signal lines and the plurality of fourth signal lines are curved; and
   a light guide element, disposed corresponding to the light modulation module, wherein the light guide element comprises a plurality of microstructures extending along a third direction, wherein an included angle between the third direction and the first direction and an included angle between the third direction and the second direction are greater than or equal to 30 degrees and less than or equal to 60 degrees,
   wherein one of the plurality of microstructures is a groove or a bump,
   wherein each of the plurality of first signal lines and each of the plurality of second signal lines respectively comprise a plurality of first patterns, and each of the plurality of first patterns has a first inflection point,
   wherein each of the plurality of third signal lines and each of the plurality of fourth signal lines respectively comprise a plurality of second patterns, and each of the plurality of second patterns has a second inflection point,
   wherein a period of one of the plurality of first signal line and a period of one of the plurality of third signal line are different, and a period of one of the plurality of second signal line and a period of one of the plurality of fourth signal line are different,
   wherein one of the plurality of first patterns of the plurality of first signal lines has a first width along the first direction, one of the plurality of first patterns of the plurality of second signal lines has the first width along the second direction, one of the plurality of second patterns of the plurality of third signal lines has a second width along the first direction, and one of the plurality of second patterns of the plurality of fourth signal lines has the second width along the second direction,
   wherein the first width is different from the second width.

2. The electronic device according to claim 1, wherein a distance between adjacent two of the plurality of second signal lines is an even multiple of a half of the first width.

3. The electronic device according to claim 2, wherein the adjacent two of the plurality of second signal lines are parallel.

4. The electronic device according to claim 1, wherein a distance between adjacent two of the plurality of second signal lines is an odd multiple of a half of the first width.

5. The electronic device according to claim 4, wherein the adjacent two of the plurality of second signal lines are mirror-symmetrical.

6. The electronic device according to claim 1, wherein an included angle between a tangent line of the first inflection point and the first direction is greater than or equal to 30 degrees and less than or equal to 60 degrees.

7. The electronic device according to claim 1, wherein an included angle between a tangent line of the second inflection point of the each of the plurality of second patterns and the first direction is different from an included angle between a tangent line of the first inflection point of the each of the plurality of first patterns and the first direction.

8. The electronic device according to claim 1, wherein an included angle between a tangent line of the second inflection point of the each of the plurality of the second patterns and the second direction is different from an included angle between a tangent line of the first inflection point of the each of the plurality of first patterns and the second direction.

9. The electronic device according to claim 1, further comprising:
   a display unit, disposed corresponding to a light incident region of the light guide element and providing an image beam, wherein the image beam enters the light guide element through the light incident region and is emitted out through a light output region of the light guide element, the microstructures are disposed in the light output region, and the light modulation module is disposed adjacent to the light output region.

10. The electronic device according to claim 9, wherein the display unit comprises a micro light emitting diode display unit, a micro organic light emitting diode display unit, or a liquid crystal display unit on silicon.

11. The electronic device according to claim 9, further comprising:
   a lens group, disposed between the light incident region of the light guide element and the display unit.

12. The electronic device according to claim 1, wherein the light modulation module is an electronically controlled light modulation module, wherein one of the plurality of first signal lines and the plurality of second signal lines is a scan line, and the other one of the plurality of first signal lines and the plurality of second signal lines is a data line.

13. The electronic device according to claim 1, wherein each of the plurality of first patterns is S-shaped.

14. The electronic device according to claim 1, wherein the light modulation module has a plurality of units, and the plurality of units have a consistent curve pattern design and are arranged in an array, wherein each of the plurality of units comprises the plurality of first signal lines and the plurality of second signal lines, and at least one of the plurality of first signal lines and the plurality of second signal lines has various curve pattern designs.

15. The electronic device according to claim 14, wherein in each of the plurality of units, at least one of the plurality of first signal lines or at least one of the plurality of second signal lines has a plurality of amplitudes, or at least one of the plurality of first signal lines or at least one of the plurality of second signal lines has curve patterns of various widths.

* * * * *